United States Patent
Conell et al.

(10) Patent No.: US 10,777,998 B2
(45) Date of Patent: Sep. 15, 2020

(54) CIRCUIT FOR IDENTIFYING THE SOURCE OF A POWER FAULT IN A DUAL POWER SOURCE ELECTRICAL SYSTEM

(71) Applicant: GM Global Technology Operations LLC, Detroit, MI (US)

(72) Inventors: Jonathan O. Conell, Sterling Heights, MI (US); Robert A. De Stefano, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 228 days.

(21) Appl. No.: 16/053,073

(22) Filed: Aug. 2, 2018

(65) Prior Publication Data

US 2020/0044437 A1 Feb. 6, 2020

(51) Int. Cl.
*H02H 3/20* (2006.01)
*B60R 16/03* (2006.01)
*H02H 1/00* (2006.01)
*H02J 4/00* (2006.01)

(52) U.S. Cl.
CPC .......... *H02H 3/207* (2013.01); *B60R 16/03* (2013.01); *H02H 1/0007* (2013.01); *H02J 4/00* (2013.01)

(58) Field of Classification Search
CPC ........... H02H 3/20; H02H 3/207; H02H 3/24; H02H 3/26; H02H 1/0007; B60R 16/03; H02J 4/00
See application file for complete search history.

(56) References Cited

U.S. PATENT DOCUMENTS

| | | | | |
|---|---|---|---|---|
| 6,160,725 | A * | 12/2000 | Jansen | H02J 1/102 363/65 |
| 9,184,582 | B2 | 11/2015 | Koch et al. | |
| 9,440,600 | B2 | 9/2016 | Koch et al. | |
| 9,911,249 | B2 | 3/2018 | Koch et al. | |
| 2004/0184208 | A1* | 9/2004 | Liu | H02H 3/207 361/90 |
| 2011/0185206 | A1* | 7/2011 | Castles | H02P 9/307 713/320 |
| 2014/0077592 | A1* | 3/2014 | Koch | B60L 3/0046 307/9.1 |

* cited by examiner

*Primary Examiner* — Adolf D Berhane (57) ABSTRACT

A circuit for regulating power between a first power source, a second power source, and a load is disclosed. The circuit includes a first switch electrically coupled to a second switch, where the first switch and the second switch are arranged relative to one another to block current in opposing directions when opened. The first switch is electrically coupled to the first power source and the second switch is electrically coupled to the load. The circuit also includes third switch electrically coupled to a fourth switch, where the third switch and the fourth switch are arranged relative to one another to block current in opposing directions when opened. The third switch is electrically coupled to the second power source and the fourth switch is electrically coupled to the load and the second switch. The circuit also includes a first voltage sensor, a second voltage sensor, a first current flow sensor, and a second current flow sensor.

20 Claims, 3 Drawing Sheets

CIRCUIT FOR IDENTIFYING THE SOURCE OF A POWER FAULT IN A DUAL POWER SOURCE ELECTRICAL SYSTEM

INTRODUCTION

The present disclosure relates to a circuit for regulating power and, more particularly, to a circuit for identifying the source of a power fault in a dual power source electrical system.

As a preventive measure, some vehicles include redundant power systems to mitigate power faults. Due to the nature of some electrical systems, the redundant power systems may need to be connected to one another to create a vehicle power grid. Accordingly, the vehicle power grid includes dual power sources for providing electrical energy to the system.

The vehicle power grid may include some electrical sub-systems that are only connected to one of the power sources, while other electrical systems are connected to both power sources. However, the electrical sub-systems connected to both power sources only include a single power input. If a power fault is detected at the input of one of the electrical sub-systems connected to both power sources, the system mitigates the fault by disabling one of the power sources. In other words, the system identifies which power source created the fault, and then temporarily disables that power source. However, the electrical sub-systems that are only connected to the disabled power source no longer receive electrical power.

Thus, there exists a need in the art for an improved approach for detecting and mitigating power faults in a power grid.

SUMMARY

According to several aspects, a circuit for regulating power between a first power source, a second power source, and a load is disclosed. The circuit includes a first switch electrically coupled to a second switch, where the first switch and the second switch are arranged relative to one another to block current in opposing directions when opened. The first switch is electrically coupled to the first power source and the second switch is electrically coupled to the load. The circuit also includes third switch electrically coupled to a fourth switch, where the third switch and the fourth switch are arranged relative to one another to block current in opposing directions when opened. The third switch is electrically coupled to the second power source and the fourth switch is electrically coupled to the load and the second switch. The circuit also includes a first voltage sensor, a second voltage sensor, a first current flow sensor, and a second current flow sensor. The circuit also includes a first voltage sensor for measuring a first voltage between the first power source and the first switch, a second voltage sensor for measuring a second voltage between the second power source and the third switch, a first current flow sensor for measuring a first current flow direction between the first switch and the second switch, and a second current flow sensor for measuring a second current flow direction between the third switch and the fourth switch. The circuit is configured to open at least one of the first switch, the second switch, the third switch, and the fourth switch in response to detecting a power fault based on the first voltage, the second voltage, the first current flow, and the second current flow direction.

In an additional aspect of the present disclosure, the circuit further includes a control module electrically connected with the first switch, the second switch, the third switch, the fourth switch, the first voltage sensor, the second voltage sensor, the first current flow sensor, and the second current flow sensor.

In another additional aspect of the disclosure, the control module executes instructions to determine the first voltage and the second voltage both indicate an undervoltage condition. The control module also detects the first current flow direction is positive and the second current flow direction is negative. The control module also determines the second power source is creating the undervoltage condition based on the first current flow and the second current flow direction. In response to determining the second power source is creating the undervoltage condition, the control module executes instructions to open the third switch.

In another additional aspect of the disclosure, the control module executes instructions to determine the first voltage and the second voltage both include an undervoltage condition. The control module also detects the first current flow is negative and the second current flow direction is positive. The control module also determines the first power source is creating the undervoltage condition based on the first current flow and the second current flow direction. In response to determining the first power source is creating the undervoltage condition, the control module executes instructions to open the first switch.

In another additional aspect of the disclosure, the control module executes instructions to determine the first voltage and the second voltage both include an undervoltage condition. The control module also determines the first current flow and the second current flow direction are both positive. The control module also determines the load is creating the undervoltage condition. In response to determining the load is creating the undervoltage condition, the control module executes instructions to open both the second switch and the fourth switch.

In another aspect of the disclosure, the control module executes instructions to determine the first voltage and the second voltage both include an overvoltage condition. The control module also detects the first current flow is negative and the second current flow direction is positive. The control module also determines the second power source is creating the overvoltage condition based on the first current flow and the second current flow direction. In response to determining the second power source is creating the overvoltage condition, the control module executes instructions to open the fourth switch.

In still another aspect of the disclosure, the control module executes instructions to determine the first voltage and the second voltage both include an overvoltage condition. The control module also detects the first current flow is positive and the second current flow direction is negative. The control module also determines the first power source is creating the overvoltage condition based on the first current flow and the second current flow direction. In response to determining the first power source is creating the overvoltage condition, the control module executes instructions to open the second switch.

In another aspect of the disclosure, the control module executes instructions to determine the first voltage and the second voltage both include an overvoltage condition. The control module also detects the first current flow is negative and the second current flow direction is negative. The control module also determines the load is creating the overvoltage condition based on the first current flow and the second current flow direction. In response to determining the load is creating the overvoltage condition, the control module executes instructions to open the first switch and the third switch.

In still another aspect of the disclosure, the first switch, the second switch, the third switch, and the fourth switch are metal-oxide-semiconductor field-effect transistors (MOSFETs), junction gate field-effect transistors (JFETs), or bipolar junction transistors (BJTs).

In another aspect of the disclosure, the power fault is either an undervoltage condition or an overvoltage condition.

In another aspect of the present disclosure, an electrical system is disclosed and includes a first power source, a second power source, a load electrically connected with both the first power source and the second power source, and a circuit electrically connected with the first power source, the second power source, and the load. The circuit includes a first switch electrically coupled to a second switch, where the first switch and the second switch are arranged relative to one another to block current in opposing directions when opened. The first switch is electrically coupled to the first power source and the second switch is electrically coupled to the load. The circuit also includes third switch electrically coupled to a fourth switch, where the third switch and the fourth switch are arranged relative to one another to block current in opposing directions when opened. The third switch is electrically coupled to the second power source and the fourth switch is electrically coupled to the load and the second switch. The circuit also includes a first voltage sensor, a second voltage sensor, a first current flow sensor, and a second current flow sensor. The circuit also includes a first voltage sensor for measuring a first voltage between the first power source and the first switch, a second voltage sensor for measuring a second voltage between the second power source and the third switch, a first current flow sensor for measuring a first current flow direction between the first switch and the second switch, and a second current flow sensor for measuring a second current flow direction between the third switch and the fourth switch. The circuit is configured to open at least one of the first switch, the second switch, the third switch, and the fourth switch in response to detecting a power fault based on the first voltage, the second voltage, the first current flow direction, and the second current flow direction.

In another additional aspect of the disclosure, the control module executes instructions to determine the first voltage and the second voltage both indicate an undervoltage condition. The control module also detects the first current flow direction is positive and the second current flow direction is negative. The control module also determines the second power source is creating the undervoltage condition based on the first current flow and the second current flow direction. In response to determining the second power source is creating the undervoltage condition, the control module executes instructions to open the third switch.

In another additional aspect of the disclosure, the control module executes instructions to determine the first voltage and the second voltage both include an undervoltage condition. The control module also detects the first current flow is negative and the second current flow direction is positive. The control module also determines the first power source is creating the undervoltage condition based on the first current flow and the second current flow direction. In response to determining the first power source is creating the undervoltage condition, the control module executes instructions to open the first switch.

In another additional aspect of the disclosure, the control module executes instructions to determine the first voltage and the second voltage both include an undervoltage condition. The control module also determines the first current flow and the second current flow direction are both positive. The control module also determines the load is creating the undervoltage condition. In response to determining the load is creating the undervoltage condition, the control module executes instructions to open both the second switch and the fourth switch.

In another aspect of the disclosure, the control module executes instructions to determine the first voltage and the second voltage both include an overvoltage condition. The control module also detects the first current flow is negative and the second current flow direction is positive. The control module also determines the second power source is creating the overvoltage condition based on the first current flow and the second current flow direction. In response to determining the second power source is creating the overvoltage condition, the control module executes instructions to open the fourth switch.

In still another aspect of the disclosure, the control module executes instructions to determine the first voltage and the second voltage both include an overvoltage condition. The control module also detects the first current flow is positive and the second current flow direction is negative. The control module also determines the first power source is creating the overvoltage condition based on the first current flow and the second current flow direction. In response to determining the first power source is creating the overvoltage condition, the control module executes instructions to open the second switch.

In another aspect of the disclosure, the control module executes instructions to determine the first voltage and the second voltage both include an overvoltage condition. The control module also detects the first current flow is negative and the second current flow direction is negative. The control module also determines the load is creating the overvoltage condition based on the first current flow and the second current flow direction. In response to determining the load is creating the overvoltage condition, the control module executes instructions to open the first switch and the third switch.

In still another aspect of the disclosure, the first switch, the second switch, the third switch, and the fourth switch are metal-oxide-semiconductor field-effect transistors (MOSFETs), junction gate field-effect transistors (JFETs), or bipolar junction transistors (BJTs).

In another aspect of the disclosure, the power fault is either an undervoltage condition or an overvoltage condition.

According to several aspects, an electrical system for a vehicle is disclosed. The electrical system includes a first power source, a second power source, a first electrical system electrically connected with the first power source, a second electrical system electrically connected with the second power source, a load electrically connected with both the first power source and the second power source, and a circuit electrically connected with the first power source, the second power source, and the load. The circuit includes a first switch electrically coupled to a second switch, where the first switch and the second switch are arranged relative to one another to block current in opposing directions when opened. The first switch is electrically coupled to the first power source and the second switch is electrically coupled to the load. The circuit also includes third switch electrically coupled to a fourth switch, and the third switch and the fourth switch are arranged relative to one another to block current in opposing directions when opened. The third switch is electrically coupled to the second power source and the fourth switch is electrically coupled to the load and the second switch. The circuit also includes a first voltage sensor, a second voltage sensor, a first current flow sensor, and a second current flow sensor. The circuit also includes a first voltage sensor for measuring a first voltage between the first power source and the first switch, a second voltage sensor for measuring a second voltage between the second power source and the third switch, a first current flow sensor for measuring a first current flow direction between the first switch and the second switch, and a second current flow sensor for measuring a second current flow direction between the third switch and the fourth switch. The circuit is configured to open at least one of the first switch, the second switch, the third switch, and the fourth switch in response to detecting either an undervoltage condition or an overvoltage condition based on the first voltage, the second voltage, the first current flow direction, and the second current flow direction.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
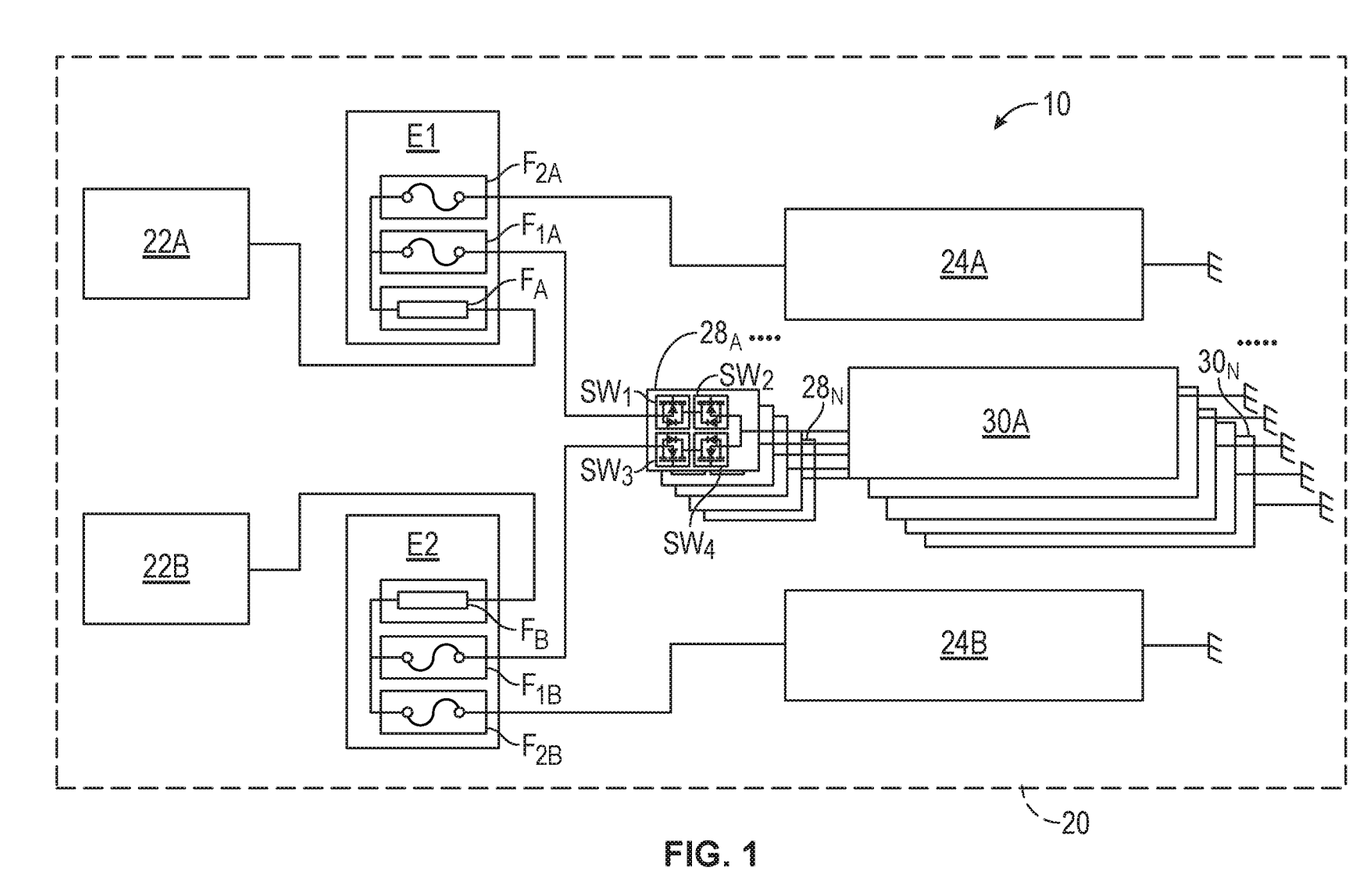
FIG. 1 is a schematic diagram of a power grid having two power sources and a circuit electrically connected with both power sources and a single source electrical power system according to an exemplary embodiment.

Referring to FIG. 1, a schematic diagram of an exemplary power grid 10 having dual power sources 22A, 22B is illustrated. In the non-limiting embodiment as shown, the power grid 10 is part of a vehicle 20. The vehicle 20 may be any device for transporting goods or passengers such as, for example, an automobile or an aircraft. The power sources 22A, 22B are configured to supply electrical power to a plurality of electrical sub-systems and may be, for example, generators or batteries. The power grid 10 includes a first electrical center $E_1$, a second electrical center $E_2$, a first single source electrical system 24A, a second single source electrical system 24B, at least one circuit $28_A$-$28_N$, and at least one dual source electrical system $30_A$-$30_N$. The circuit 28 includes four switches $SW_1$, $SW_2$, $SW_3$, and $SW_4$. As explained below, the switches are oriented relative to one another based on their corresponding body diode orientation to block current in opposing directions. In response to detecting a power fault, the circuit 28 opens at least one of the switches $SW_1$, $SW_2$, $SW_3$, $SW_4$ to stop the flow of current in a single direction or opposing direction when two switches are opened.

In the embodiment as shown, each electrical center $E_1$, $E_2$ includes a plurality of fuses and a pre-fuse. More specifically, the first electrical center $E_1$ includes a first fuse $F_{1A}$, a second fuse $F_{2A}$, and a pre-fuse $F_A$. Similarly, the second electrical center $E_2$ includes a first fuse $F_{1B}$, a second fuse $F_{2B}$, and a pre-fuse $F_B$. The first power source 22A is electrically connected to and provides power to the single source electrical system 24A and the dual source electrical system 30. Specifically, the pre-fuse $F_A$ is electrically coupled to the first power source 22A, the first fuse $F_{1A}$, and the second fuse $F_{2A}$. The first fuse $F_{1A}$ is also electrically coupled to the circuit 28 and the second fuse F2A is also electrically coupled to the first single source electrical system 24A. Similarly, the second power source 22B is in electrical connection and provides power to the single source electrical system 24B and the dual source electrical system 30. The pre-fuse $F_B$ is electrically coupled to the second power source 22B, the first fuse $F_{1B}$, and the second fuse $F_{2B}$. The first fuse $F_{1B}$ is also electrically coupled to the circuit 28 and the second fuse $F_{2B}$ is also electrically coupled to the second single source electrical system 24B.

In one embodiment, if the power grid 10 is part of a vehicle 20, the first electrical system 24A, the second single source electrical system 24B, and the dual power source electrical system 30 are various electrical sub-systems for operating the vehicle 20. For example, the first electrical system 24A, the second single source electrical system 24B, and the dual power source electrical system 30 may include electronics for braking, steering, or for autonomous control. Although FIG. 1 shows the power grid 10 as part of the vehicle 20, it is to be appreciated that this illustration is merely exemplary in nature, and power grid 10 may be part of any system having dual power sources. Moreover, although the switches $SW_1$, $SW_2$, $SW_3$, and $SW_4$ are illustrated as metal-oxide-semiconductor field-effect transistors (MOSFETs), it is to be appreciated that other solid-state switches may be used as well. For example, applications involving relatively high current values, such as those experienced in an automobile, may use MOSFETs or junction gate field-effect transistors (JFETs). Furthermore, in some limited circumstances, applications that involve lower current values may use bipolar junction transistors (BJTs) instead.

Figure 2A:
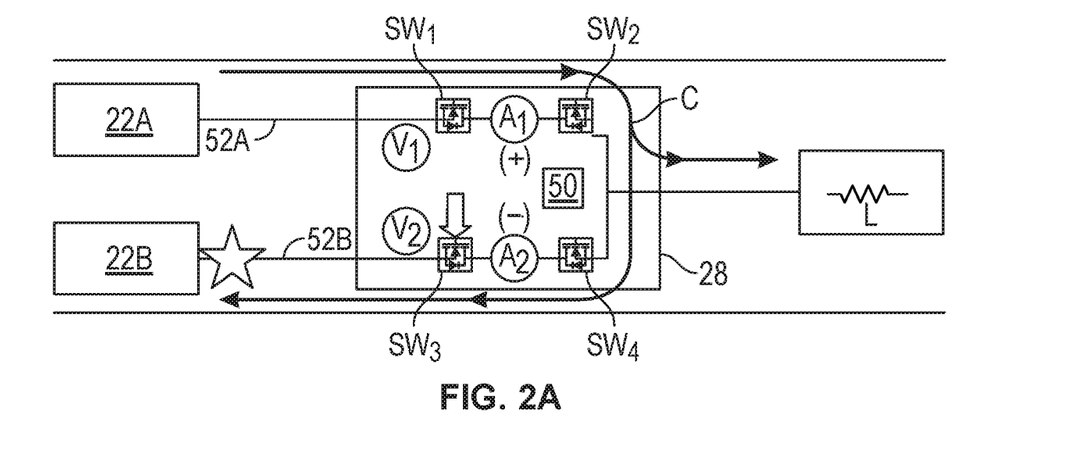
FIG. 2A is a schematic diagram illustrating the circuit and both the power sources shown in FIG. 1 as well as a load, where one of the power sources creates an undervoltage condition according to an exemplary embodiment.
Figure 2B:
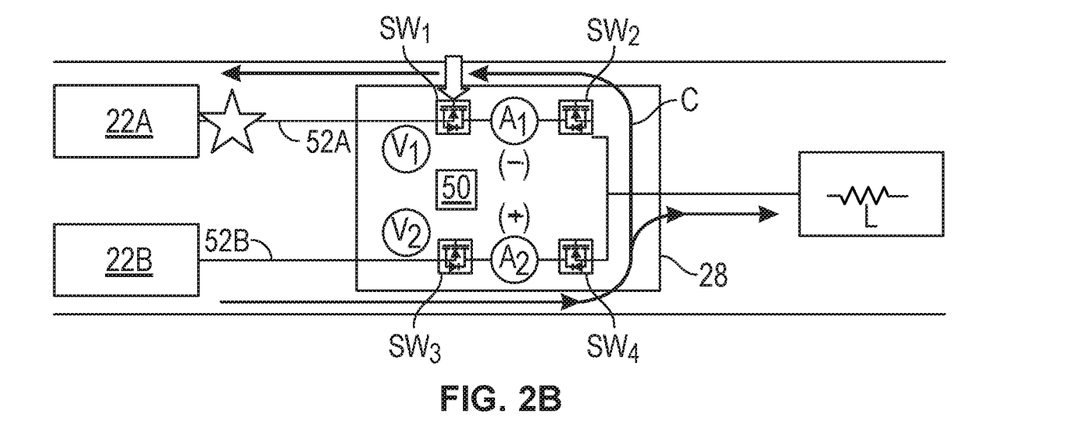
FIG. 2B is a schematic diagram illustrating the circuit, the power sources, and the load, where the other power source creates the undervoltage condition according to an exemplary embodiment.
Figure 2C:
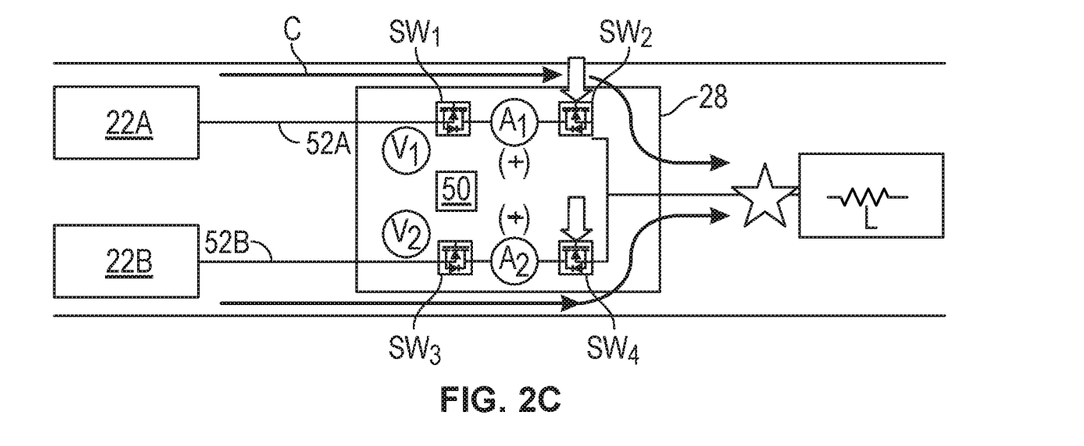
FIG. 2C is a schematic diagram illustrating the circuit, the power sources, and the load, where the load creates the undervoltage condition according to an exemplary embodiment.

FIGS. 2A, 2B, and 2C illustrate the circuit 28 shown in FIG. 1 in electrical connection with the first power source 22A, the second power source 22B, and a load L. The load L represents the dual source electrical system 30 shown in FIG. 1. In the embodiment as shown in FIGS. 2A, 2B, and 2C, the circuit 28 detects an undervoltage condition created by either the first power source 22A, the second power source 22B, or the load L. In response to determining the undervoltage condition, a control module 50 executes instructions to open at least one of the switches $SW_1$, $SW_2$, $SW_3$, $SW_4$.

In the embodiment as shown in FIGS. 2A, 2B, and 2C, the control module 50 is integrated with the circuit 28, however, in an alternative embodiment the control module 50 and the circuit 28 are separate components. The control module 50 is a non-generalized, electronic control device having a preprogrammed digital computer or processor, memory or non-transitory computer readable medium used to store data such as control logic, instructions, image data, lookup tables, etc., and a plurality of input/output peripherals or ports. The processor of the control module 50 is configured to execute the control logic or instructions.

The circuit 28 also includes a first voltage sensor $V_1$, a second voltage sensor $V_2$, a first current flow sensor $A_1$, and a second current flow sensor $A_2$ that are in electrical connection with the control module 50. The voltage sensors $V_1$, $V_2$ are configured to detect the voltage at their respective lines 52A, 52B. The voltage sensors $V_1$, $V_2$ then send a signal to the control module 50 indicating the voltage values at the lines 52A, 52B. When a power fault occurs within the power grid 10 (FIG. 1), then the voltage sensors $V_1$, $V_2$ detect a voltage representative of either an undervoltage condition or an overvoltage condition. Specifically, a voltage representative of an undervoltage condition is detected by one of the voltage sensors $V_1$, $V_2$ in response to the voltage in one of the lines 52A, 52B falling below a predetermined low voltage value. For example, in one embodiment, the predetermined low voltage value is less about 11 Volts. A voltage representative of an overvoltage condition is detected by one of the voltage sensors $V_1$, $V_2$ in response to the voltage in one of the lines 52A, 52B rising above a predetermined high voltage value. For example, in one embodiment the predetermined high voltage value is greater than about 16 Volts.

The current sensors $A_1$, $A_2$ are configured to detect the direction of the current flow, where current flowing towards the load L is positive and current flowing away from the load L is negative. For example, referring specifically to FIG. 2A, a current flow C is shown. The current flow C shown in FIG. 2A begins at the first power source 22A, flows to the load L, and is blocked by the third switch $SW_3$. Referring specifically to FIG. 2A, the current flow C between the first switch $SW_1$ and the second switch $SW_2$ is positive. In other words, the current flow C travels in a positive direction from the first switch $SW_1$ to the second switch $SW_2$. Accordingly, the first current flow sensor $A_1$ detects a positive current (+), which is shown in FIG. 2A. In contrast, the current flow C between the third switch $SW_3$ and the fourth switch $SW_4$ is oriented in an opposite direction to the current flow C between the first switch $SW_1$ and the second switch $SW_2$. Thus, the second current flow sensor $A_2$ detects a negative current, which is denoted as (−) in FIG. 2A.

Referring generally to FIGS. 2A, 2B, and 2C, the orientation of the components within the circuit 28 will now be explained. Specifically, the control module 50 is electrically connected with the first switch $SW_1$, the second switch $SW_2$, the third switch $SW_3$, the fourth switch $SW_4$, the first voltage sensor $V_1$, the second voltage sensor $V_2$, the first current flow sensor $A_1$, and the second current flow sensor $A_2$. The first switch $SW_1$ is electrically coupled to the second switch $SW_2$. The first switch $SW_1$ and the second switch $SW_2$ are arranged relative to one another to block current in opposing directions when opened. Specifically, as explained below, the body diode orientation of the first switch SW1 and the second switch SW2 allows for current to be blocked in opposing directions. The first switch $SW_1$ is also electrically coupled to the first power source 22A and the second switch is electrically coupled to the load L. The third switch $SW_3$ is electrically coupled to the fourth switch $SW_4$, where the third switch $SW_1$ and the fourth switch $SW_4$ are arranged relative to one another to block current in opposing directions when opened. The third switch $SW_3$ is electrically coupled to the second power source 22B, and the fourth switch $SW_4$ is electrically coupled to the load L and the second switch $SW_2$. However, it is to be appreciated that all the switches $SW_1$, $SW_2$, $SW_3$, and $SW_4$ are electrically connected to one another.

The body diode orientation for the switches $SW_1$, $SW_2$, $SW_3$, and $SW_4$ shall now be explained. A body diode of a field-effect transistor (FET) is located between the drain (cathode) and the source (anode) of the FET, and only blocks current in only one direction. Therefore, the MOSFET switches shown in the figures only block current in one direction. The reason two switches are provided on each power pathway is to block the current flow in both directions. For example, the body diodes for switches $SW_1$ and $SW_2$ are oriented relative to one another such that their body diodes are in opposite directions. In other words, the body diodes for switches $SW_1$ and $SW_2$ block current in opposite directions. More specifically, the first switch $SW_1$ prevents current from flowing from the load L to the first power source 22A when opened, while the second switch $SW_2$ prevents current from flowing from the first power source 22A to the load L. The two remaining switches, $S_3$ and $S_4$, also include a similar configuration.

The voltage sensors $V_1$, $V_2$ and the current sensors $A_1$, $A_2$ will now be described. When the switches $SW_1$, $SW_2$, $SW_3$, and $SW_4$ are open, the first voltage sensor $V_1$ measures a first voltage between the first power source 22A and the first switch $SW_1$. The second voltage sensor $V_2$ measures a second voltage between the second power source 22B and the third switch $SW_3$. The first current flow sensor $A_1$ measures a first current flow direction between the first switch $SW_1$ and the second switch $SW_2$, and the second current flow sensor $A_2$ measures a second current flow direction between the third switch $SW_3$ and the fourth switch $SW_4$. As explained below, one of the first switch $SW_1$, the second switch $SW_2$, the third switch $SW_3$, and the fourth switch $SW_4$ are opened in response to detecting a power fault based on the first voltage, the second voltage, the first current flow direction, and the second current flow direction.

In the embodiment as shown in FIGS. 2A, 2B, and 2C, the voltage sensors $V_1$, $V_2$ detect an undervoltage condition. In the embodiment as shown in FIG. 2A, the second power source 22B is creating the undervoltage condition, which is indicated by a star. In the embodiment as shown in FIG. 2B, the first power source 22A creates the undervoltage condition. In the embodiment as shown in FIG. 2C, the load L is creating the undervoltage condition. The undervoltage conditions shown in FIGS. 2A, 2B, and 2C will now be described.

Referring specifically to FIG. 2A, the control module 50 monitors the voltage sensors $V_1$, $V_2$ and the current sensors $A_1$, $A_2$, and determines the first voltage from the first voltage sensor $V_1$ and the second voltage $V_2$ from the second voltage sensor $V_2$ both indicate an undervoltage condition. The control module 50 detects the first current flow direction from the first current flow sensor $A_1$ is positive and the second current flow direction from the second current flow sensor $A_2$ is negative. The control module 50 then determines the second power source 22B is creating the undervoltage condition based on the first current flow direction and the second current flow direction. In response to determining the second power source 22B is creating the undervoltage condition, the control module 50 executes instructions to open the third switch $SW_3$.

Referring to both FIGS. 1 and 2A, the third switch $SW_3$ is opened in response to a short circuit condition relative to the second power source 22B. When the third switch $SW_3$ is opened, the first power source 22A is prevented from feeding the fault on the second power source 22B. It is to be appreciated that the body diode of the third switch SW3 blocks the flow of current from the first power source 22A, regardless of the voltage values. However, current may flow from the second power source 22B to the first power source 22A when the third switch $SW_3$ is open and the second power source 22B is at a voltage value that is higher than the sum of the first power source 22A voltage plus the diode drop voltage of the third switch $SW_3$ (i.e., voltage of the first power source 22A+diode drop voltage of the third switch $SW_3$).

Referring to FIG. 2B, the control module 50 monitors the voltage sensors $V_1$, $V_2$ and the current sensors $A_1$, $A_2$, and determines the first voltage from the first voltage sensor $V_1$ and the second voltage $V_2$ from the second voltage sensor $V_2$ both indicate an undervoltage condition. The control module 50 detects the first current flow direction from the first current flow sensor $A_1$ is negative and the second current flow direction from the second current flow sensor $A_2$ is positive. The control module 50 then determines the first power source 22A is creating the undervoltage condition based on the first current flow direction and the second current flow direction. In response to determining the first power source 22A is creating the undervoltage condition, the control module 50 executes instructions to open the first switch $SW_1$.

Referring to FIG. 2C, the control module 50 monitors the voltage sensors $V_1$, $V_2$ and the current sensors $A_1$, $A_2$, and determines the first voltage from the first voltage sensor $V_1$ and the second voltage $V_2$ from the second voltage sensor $V_2$ both indicate an undervoltage condition. The control module 50 detects the first current flow direction from the first current flow sensor $A_1$ and the second current flow direction from the second current flow sensor $A_2$ are both positive. The control module 50 then determines the load is creating the undervoltage condition based on the first current flow direction and the second current flow direction. In response to determining the load L is creating the undervoltage condition, the control module 50 executes instructions to open both the second switch $SW_2$ and the fourth switch $SW_4$.

Figure 3A:
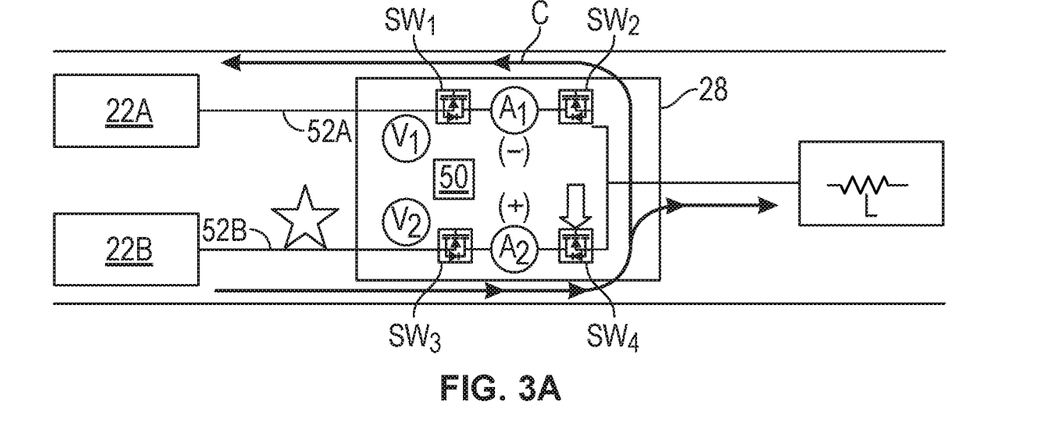
FIG. 3A is a schematic diagram illustrating the circuit, the power sources, and the load, where one of the power sources creates an overvoltage condition according to an exemplary embodiment.
Figure 3B:
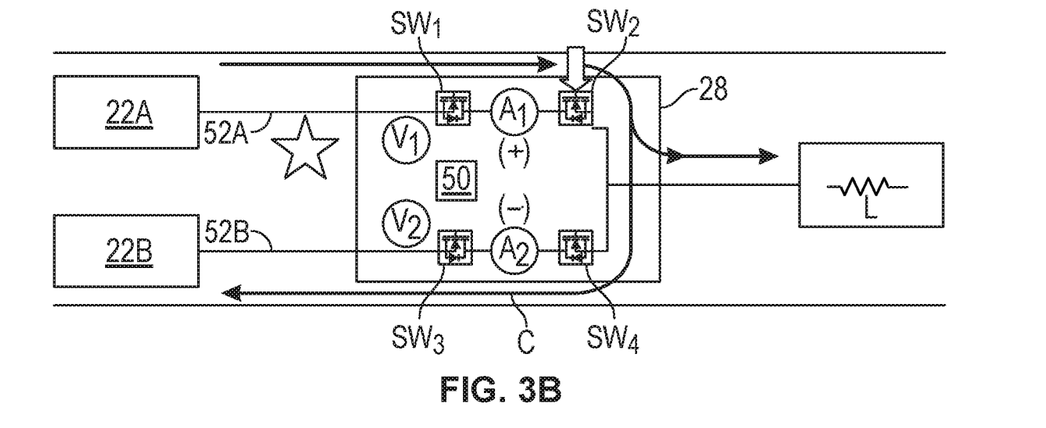
FIG. 3B is a schematic diagram illustrating the circuit, the power sources, and the load, where the other power source creates the overvoltage condition according to an exemplary embodiment.
Figure 3C:
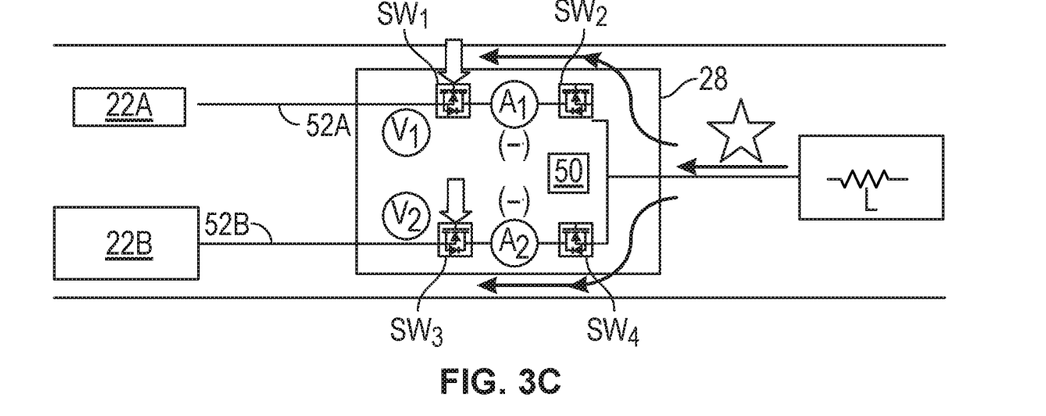
FIG. 3C is a schematic diagram illustrating the circuit, the power sources, and the load, where the load creates the overvoltage condition according to an exemplary embodiment.

Turning now to FIGS. 3A, 3B, and 3C, an overvoltage condition is now illustrated. Specifically, FIG. 3A illustrates the second power source 22B creating the overvoltage condition, FIG. 3B illustrates the first power source 22A as creating the overvoltage condition, and FIG. 3C illustrates the load L as creating the overvoltage condition. Referring now to FIG. 3A, the control module 50 monitors the voltage sensors $V_1$, $V_2$ and the current sensors $A_1$, $A_2$, and determines the first voltage from the first voltage sensor $V_1$ and the second voltage $V_2$ from the second voltage sensor $V_2$ both indicate an overvoltage condition. The control module 50 detects the first current flow direction from the first current sensor $A_1$ is negative and the second current flow from the second current sensor $A_2$ is positive. The control module 50 determines the second power source 22B is creating the overvoltage condition based on the first current flow direction and the second current flow. In response to determining the second power source 22B is creating the overvoltage condition, the control module 50 executes instructions to open the fourth switch $SW_4$.

Referring now to FIG. 3B, the control module 50 monitors the voltage sensors $V_1$, $V_2$ and the current sensors $A_1$, $A_2$, and determines the first voltage from the first voltage sensor $V_1$ and the second voltage $V_2$ from the second voltage sensor $V_2$ both indicate an overvoltage condition. The control module 50 detects the first current flow direction from the first current sensor $A_1$ is positive and the second current flow from the second current sensor $A_2$ is negative. The control module 50 then determines the first power source 22A is creating the overvoltage condition based on the first current flow direction and the second current flow. In response to determining the first power source 22A is creating the overvoltage condition, the control module 50 executes instructions to open the second switch $SW_2$.

Referring now to FIG. 3C, the control module 50 monitors the voltage sensors $V_1$, $V_2$ and the current sensors $A_1$, $A_2$, and determines the first voltage from the first voltage sensor $V_1$ and the second voltage $V_2$ from the second voltage sensor $V_2$ both indicate an overvoltage condition. The control module 50 detects the first current flow direction from the first current sensor $A_1$ is negative and the second current flow from the second current sensor $A_2$ is negative. The control module 50 then determines the load L is creating the overvoltage condition based on the first current flow direction and the second current flow. In response to determining the load L is creating the overvoltage condition, the control module 50 executes instructions to open the first switch $SW_1$ and the third switch $SW_3$.

Referring generally to the figures, technical effects and benefits of the disclosed system include providing an approach for identifying the source of a power fault and blocking the source of the power fault in a matter of microseconds. Conventional approaches for mitigating a power fault involve disabling the entire source of the power fault. As a result, the electrical sub-systems that are only connected to the disabled power source no longer receive electrical power. In contrast, the disclosed circuit provides an improved approach for mitigating power faults by simply opening a solid-state switch to cut the flow of power from the power source, without the need to disable a power supply.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A circuit for regulating power between a first power source, a second power source, and a load, the circuit comprising:
   a first switch electrically coupled to a second switch, wherein the first switch is electrically coupled to the first power source, the second switch is electrically coupled to the load, and the first switch and the second switch are arranged relative to one another to block current in opposing directions when opened;
   a third switch electrically coupled to a fourth switch, wherein the third switch is electrically coupled to the second power source, the fourth switch is electrically coupled to the load and the second switch, and the third switch and the fourth switch are arranged relative to one another to block current in opposing directions when opened;

a first voltage sensor for measuring a first voltage between the first power source and the first switch;

a second voltage sensor for measuring a second voltage between the second power source and the third switch;

a first current flow sensor for measuring a first current flow direction between the first switch and the second switch; and a second current flow sensor for measuring a second current flow direction between the third switch and the fourth switch, wherein the circuit is configured to open at least one of the first switch, the second switch, the third switch, and the fourth switch in response to detecting a power fault based on the first voltage, the second voltage, the first current flow direction, and the second current flow direction.

2. The circuit of claim 1, further comprising a control module electrically connected with the first switch, the second switch, the third switch, the fourth switch, the first voltage sensor, the second voltage sensor, the first current flow sensor, and the second current flow sensor.

3. The circuit of claim 2, wherein the control module executes instructions to:
    determine the first voltage and the second voltage both indicate an undervoltage condition;
    detect the first current flow direction is positive and the second current flow direction is negative;
    determine the second power source is creating the undervoltage condition based on the first current flow direction and the second current flow direction; and
    in response to determining the second power source is creating the undervoltage condition, open the third switch.

4. The circuit of claim 2, wherein the control module executes instructions to:
    determine the first voltage and the second voltage both include an undervoltage condition;
    detect the first current flow direction is negative and the second current flow direction is positive;
    determine the first power source is creating the undervoltage condition based on the first current flow direction and the second current flow direction; and
    in response to determining the first power source is creating the undervoltage condition, open the first switch.

5. The circuit of claim 2, wherein the control module executes instructions to:
    determine the first voltage and the second voltage both include an undervoltage condition;
    determine the first current flow direction and the second current flow direction are both positive;
    determine the load is creating the undervoltage condition; and
    in response to determining the load is creating the undervoltage condition, open both the second switch and the fourth switch.

6. The circuit of claim 2, wherein the control module executes instructions to:
    determine the first voltage and the second voltage both include an overvoltage condition;
    detect the first current flow direction is negative and the second current flow direction is positive;
    determine the second power source is creating the overvoltage condition based on the first current flow direction and the second current flow direction; and
    in response to determining the second power source is creating the overvoltage condition, open the fourth switch.

7. The circuit of claim 2, wherein the control module executes instructions to:
    determine the first voltage and the second voltage both include an overvoltage condition;
    detect the first current flow direction is positive and the second current flow direction is negative;
    determine the first power source is creating the overvoltage condition based on the first current flow direction and the second current flow direction; and
    in response to determining the first power source is creating the overvoltage condition, open the second switch.

8. The circuit of claim 2, wherein the control module executes instructions to:
    determine the first voltage and the second voltage both include an overvoltage condition;
    detect the first current flow direction is negative and the second current flow direction is negative;
    determine the load is creating the overvoltage condition based on the first current flow direction and the second current flow direction; and
    in response to determining the load is creating the overvoltage condition, open the first switch and the third switch.

9. The circuit of claim 1, wherein the first switch, the second switch, the third switch, and the fourth switch are metal-oxide-semiconductor field-effect transistors (MOSFETs), junction gate field-effect transistors (JFETs), or bipolar junction transistors (BJTs).

10. The circuit of claim 1, wherein the power fault is either an undervoltage condition or an overvoltage condition.

11. An electrical system, comprising:
    a first power source;
    a second power source;
    a load electrically connected to both the first power source and the second power source; and
    a circuit in electrical connection with the first power source, the second power source, and the load, wherein the circuit includes:
        a first switch electrically coupled to a second switch, wherein the first switch is electrically coupled to the first power source, the second switch is electrically coupled to the load, and the first switch and the second switch are arranged relative to one another to block current in opposing directions when opened;
        a third switch electrically coupled to a fourth switch, wherein the third switch is electrically coupled to the second power source, the fourth switch is electrically coupled to the load and the second switch, and the third switch and the fourth switch are arranged relative to one another to block current in opposing directions when opened;
        a first voltage sensor for measuring a first voltage between the first power source and the first switch;
        a second voltage sensor for measuring a second voltage between the second power source and the third switch;
        a first current flow sensor for measuring a first current flow direction between the first switch and the second switch;

a second current flow sensor for measuring a second current flow direction between the third switch and the fourth switch; and a control module in electrical connection with the first switch, the second switch, the third switch, the fourth switch, the first voltage sensor, the second voltage sensor, the first current flow sensor, and the second current flow sensor, wherein the control module executes instructions for to open at least one of the first switch, the second switch, the third switch, and the fourth switch in response to detecting a power fault based on the first voltage, the second voltage, the first current flow direction, and the second current flow direction.

12. The electrical system of claim 11, wherein the power fault is either an undervoltage condition or an overvoltage condition.

13. The electrical system of claim 11, wherein the control module executes instructions to:
  determine the first voltage and the second voltage both include an undervoltage condition;
  detect the first current flow direction is positive and the second current flow direction is negative;
  determine the second power source is creating the undervoltage condition based on the first current flow direction and the second current flow direction; and
  in response to determining the second power source is creating the undervoltage condition, open the third switch.

14. The electrical system of claim 11, wherein the control module executes instructions to:
  determine the first voltage and the second voltage both include an undervoltage condition;
  detect the first current flow direction is negative and the second current flow direction is positive;
  determine the first power source is creating the undervoltage condition based on the first current flow direction and the second current flow direction; and
  in response to determining the first power source is creating the undervoltage condition, open the first switch.

15. The electrical system of claim 11, wherein the control module executes instructions to:
  determine the first voltage and the second voltage both include an undervoltage condition;
  determine the first current flow direction and the second current flow direction are both positive;
  determine the load is creating the undervoltage condition; and
  in response to determining the load is creating the undervoltage condition, open both the second switch and the fourth switch.

16. The electrical system of claim 11, wherein the control module executes instructions to:
  determine the first voltage and the second voltage both include an overvoltage condition;
  detect the first current flow direction is negative and the second current flow direction is positive;
  determine the second power source is creating the overvoltage condition based on the first current flow direction and the second current flow direction; and
  in response to determining the second power source is creating the overvoltage condition, open the fourth switch.

17. The electrical system of claim 13, wherein the control module executes instructions to:

determine the first voltage and the second voltage both include an overvoltage condition;
detect the first current flow direction is positive and the second current flow direction is negative;
determine the first power source is creating the overvoltage condition based on the first current flow direction and the second current flow direction; and
in response to determining the first power source is creating the overvoltage condition, open the second switch.

18. The electrical system of claim 13, wherein the control module executes instructions to:
  determine the first voltage and the second voltage both include an overvoltage condition;
  detect the first current flow direction is negative and the second current flow direction is negative;
  determine the load is creating the overvoltage condition based on the first current flow direction and the second current flow direction; and
  in response to determining the load is creating the overvoltage condition, open the first switch and the third switch.

19. The electrical system of claim 11, wherein the first switch, the second switch, and the third switch are metal-oxide-semiconductor field-effect transistors (MOSFETs), field-effect transistors (FETs), or bipolar junction transistors (BJTs).

20. An electrical system for a vehicle, comprising:
  a first power source;
  a second power source;
  a first electrical system in electrical connection with the first power source;
  a second electrical system in electrical connection with the second power source;
  a load in electrical connection with both the first power source and the second power source; and
  a circuit in electrical connection with the first power source, the second power source, and the load, wherein the circuit includes:
    a first switch electrically coupled to a second switch, wherein the first switch is electrically coupled to the first power source, the second switch is electrically coupled to the load, and the first switch and the second switch are arranged relative to one another to block current in opposing directions when opened;
    a third switch electrically coupled to a fourth switch, wherein the third switch is electrically coupled to the second power source, the fourth switch is electrically coupled to the load and the second switch, and the third switch and the fourth switch are arranged relative to one another to block current in opposing directions when opened;
    a first voltage sensor for measuring a first voltage between the first power source and the first switch;
    a second voltage sensor for measuring a second voltage between the second power source and the third switch;
    a first current flow sensor for measuring current between the first switch and the second switch;
    a second current flow sensor for measuring current between the third switch and the fourth switch; and
    a control module in electrical connection with the first switch, the second switch, the third switch, the fourth switch, the first voltage sensor, the second voltage sensor, the first current flow sensor, and the second current flow sensor, wherein the control module executes instructions for to open at least one of the first switch, the second switch, the third switch, and the fourth switch in response to detecting a either an overvoltage condition or an undervoltage condition based on the first voltage, the second voltage, the first current flow, and the second current flow direction.

\* \* \* \* \*